(12) United States Patent
Du et al.

(10) Patent No.: US 10,043,109 B1
(45) Date of Patent: Aug. 7, 2018

(54) ATTRIBUTE SIMILARITY-BASED SEARCH

(71) Applicant: A9.com, Inc., Palo Alto, CA (US)

(72) Inventors: Ming Du, Fremont, CA (US); Arnab Sanat Kumar Dhua, Mountain View, CA (US); Douglas Ryan Gray, Redwood City, CA (US); Maya Kabkab, College Park, MD (US); Aishwarya Natesh, Mountain View, CA (US); Colin Jon Taylor, Orinda, CA (US)

(73) Assignee: A9.COM, INC., Palo Alto, CA (US)

( * ) Notice: Subject to any disclaimer, the term of this patent is extended or adjusted under 35 U.S.C. 154(b) by 31 days.

(21) Appl. No.: 15/413,083

(22) Filed: Jan. 23, 2017

(51) Int. Cl.
| | |
|---|---|
| *G06K 9/62* | (2006.01) |
| *G06F 17/30* | (2006.01) |
| *G06Q 30/06* | (2012.01) |
| *G06N 3/08* | (2006.01) |
| *G06N 3/04* | (2006.01) |
| *G06K 9/46* | (2006.01) |
| *G06K 9/00* | (2006.01) |
| *G06K 9/66* | (2006.01) |

(52) U.S. Cl.
CPC ..... *G06K 9/6215* (2013.01); *G06F 17/30253* (2013.01); *G06K 9/00288* (2013.01); *G06K 9/4628* (2013.01); *G06K 9/66* (2013.01); *G06N 3/04* (2013.01); *G06N 3/088* (2013.01); *G06Q 30/0643* (2013.01)

(58) Field of Classification Search
CPC .... G06K 9/6215; G06K 9/66; G06K 9/00288; G06K 9/4628; G06F 17/30253; G06F 17/30256
See application file for complete search history.

(56) References Cited

U.S. PATENT DOCUMENTS 9,753,949 B1 * 9/2017 Malpani ................... G06K 9/66
9,767,381 B2 * 9/2017 Rodriguez-
                      Serrano ................ G06N 3/0454

OTHER PUBLICATIONS

P.F. Felzenszwalb *Object Detection with Discriminatively Trained Part-Based Models*, IEEE Transactions on Pattern Analysis and Machine Intelligence, vol. 32, No. 9, Sep. 2010.
R. Girshick *Fast R-CNN*, International Conference on Computer Vision (ICCV) 2015.
A.Krizhevsky *Image Net Classification with Deep Convolutional Neural Networks*, Neural Information Processing Systems (NIPS) 2012.
C. Szegedy *Going Deep with Convolutions*, IEEE Conference on Computer Vision and Pattern.

\* cited by examiner

*Primary Examiner* — Phuoc Tran
(74) *Attorney, Agent, or Firm* — Hogan Lovells US LLP

(57) ABSTRACT

A set of training images is obtained by analyzing text associated with various images to identify images likely demonstrating a visual attribute. Localization can be used to extract patches corresponding to these attributes, which can then have features or feature vectors determined to train, for example, a convolutional neural network. A query image can be received and analyzed using the trained network to determine a set of items whose images demonstrate visual similarity to the query image at least with respect to the attribute of interest. The similarity can be output from the network or determined using distances in attribute space. Content for at least a determined number of highest ranked, or most similar, items can then be provided in response to the query image.

20 Claims, 10 Drawing Sheets

ATTRIBUTE SIMILARITY-BASED SEARCH

BACKGROUND

Users are increasingly consuming content electronically, such as by accessing digital content provided over the Internet or another such network. Users often rely upon search queries or keyword strings that can be used to identify potentially relevant content. In many instances, however, the relevance depends at least in part to the actual query that was submitted, as well as the way in which the potentially relevant content is categorized or identified. There often is no easy way for a user to modify a query to express a desired refinement, and no accurate way for that expression to be implemented so as to locate the content of interest. This is particularly true for visual attributes that may be subjective and that are difficult to quantify through existing keyword-based approaches.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to providing content in an electronic environment. In particular, various embodiments enable search results or other content to be determined and/or refined using one or more visual attributes of the content. A set of images is obtained with associated text that enables various visual attributes to be identified that are likely represented in those images. These images can be designated as part of a training set for training a convolutional neural network for a determined attribute. The images in the set can be analyzed using a localization process to determine an image patch that likely includes a representation of the attribute, where the localization may involve detection of a face or body portion in the image, among other such options. Once determined, the image patch is analyzed to extract features (or a feature vector) that can be used to train the neural network. Once a trained network is obtained, a query image can be received for which items having similar values for the attribute can be determined. The query image can be analyzed using the trained network to determine a set of items whose images include visual similarity to the query image for the attribute of interest. The similarity can be output from the network or determined using distances in attribute space, among other such options. Content for at least a determined number of highest ranked, or most similar, items can then be provided in response to the query image.

Various other functions can be implemented within the various embodiments as well as discussed and suggested elsewhere herein.

Figure 1A:
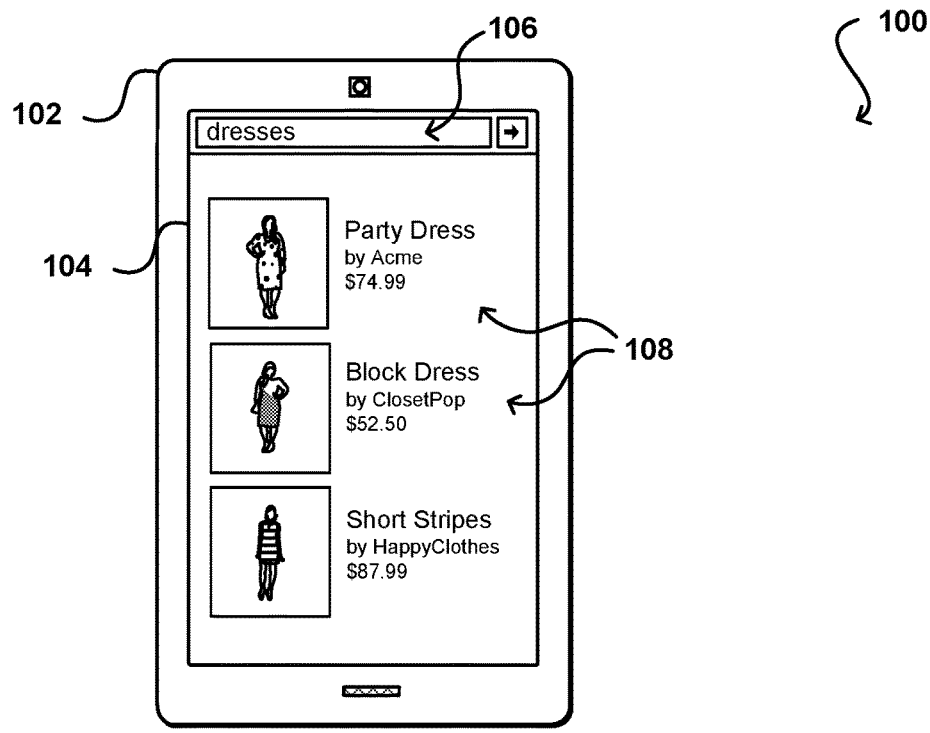
FIGS. 1A and 1B illustrate example displays of search results that can be presented in accordance with various embodiments.

FIG. 1A illustrates an example display of content 100 on a display screen 104 of a computing device 102. In this example a search query 106 has been received and a set of search results 108 determined and returned for presentation in response to the request. Conventional methods for locating search results in response to a query are well known in the art and as such will not be discussed herein in detail. In this example the user has submitted a query including the keyword "dresses" and the returned search results have been determined to be relevant in some way to the keyword. This can be due to a categorization of the results, keywords associated with the results, or tags applied to the result, among other such options. The user can scroll or otherwise navigate through the results to determine whether any of the results are of interest to the user.

Figure 1B:
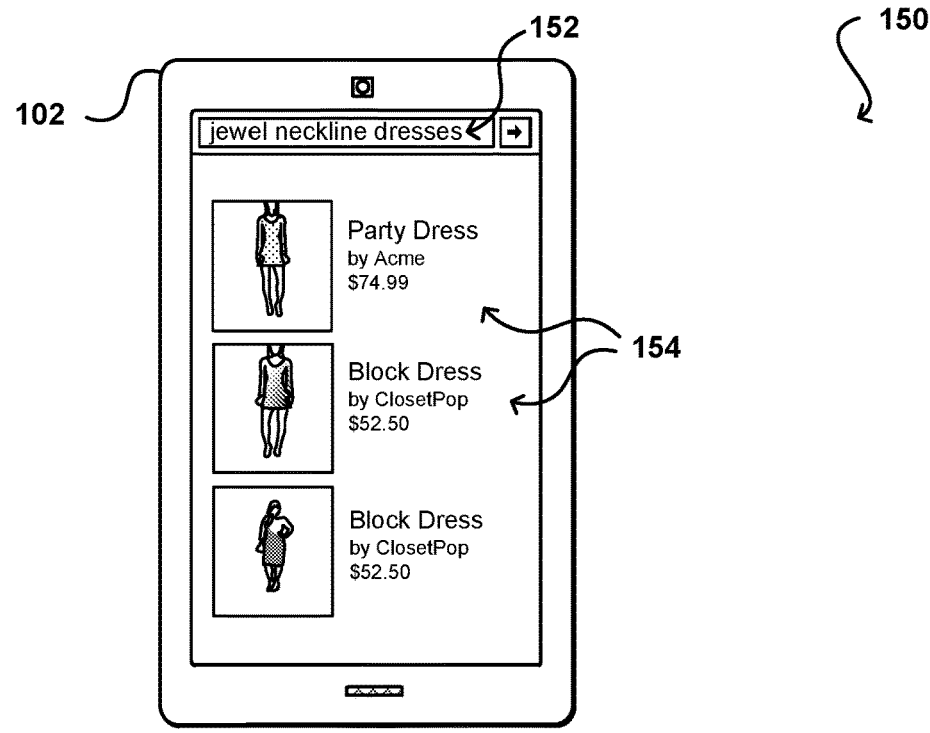

It might be the case that there were too many results returned and the user is not finding items of interest in an initial subset of the results. Accordingly, the user might want to narrow the query in order to obtain search results that are more relevant to the user based on the user's current interest. For example, FIG. 1B illustrates an updated set of search results 154 returned for a new query 152 that specifies "jewel neckline dresses." The updated set will likely include results that have been classified as jewel neckline dresses, or at least have the terms "jewel" and "neckline" in the description, etc.

There are various downsides to such approaches, however. For example, dresses may be available that have a jewel neckline, or a similar type of neckline, that may not appear in the updated results because the dresses are not categorized, classified, or otherwise identified as having a jewel neckline. There may be many visual attributes that a user might specify, such as length, shape, pocket style, sleeve style, and the like, and it will often be the case that content for dresses will not include information for all of these attributes, let alone all possible options for each attribute. Thus, a keyword-based approach will likely miss some of the relevant dresses that would otherwise correspond to the user's intent. Further, a user might have a very clear idea in her mind as to the type of result she wants to obtain, but may not know exactly how to describe the item through keywords in order to obtain the exact result. For example, the user might want to see dresses with a particular style of neckline, but may not know the correct term for that type of neckline. Similarly, if the user wants an item with sleeves of a certain length, there may be no consistent way of describing that particular length.

Figure 2:
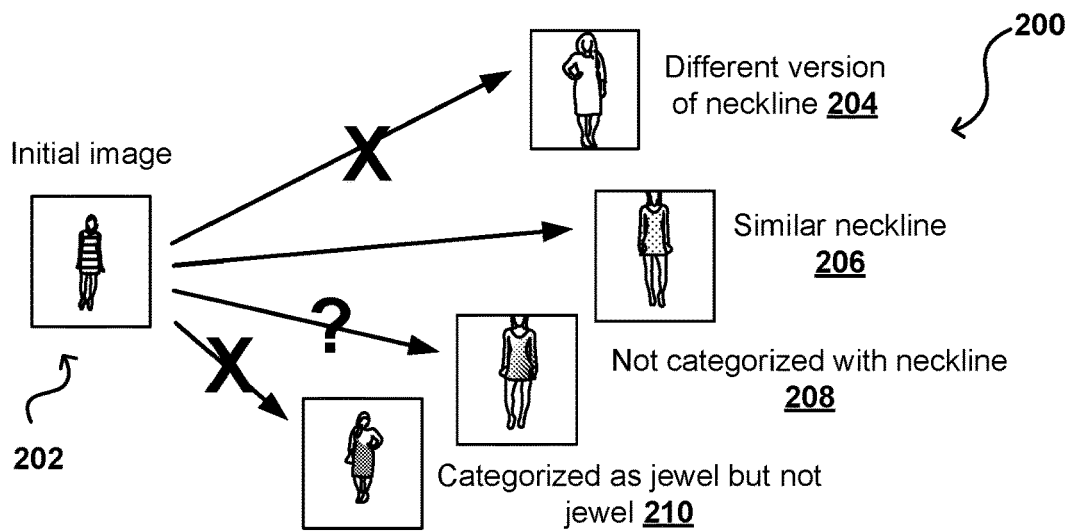
FIG. 2 illustrates example results that may or may not be located using keyword-based refinements alone in various embodiments.

As an example, FIG. 2 illustrates a situation 200 wherein an image 202 has been located and/or provided that is similar to an item of interest, or at least has some visual aspects or attributes that are of interest to the user. If the user added the term "jewel neckline" to the a query used to obtain the image 202 or that contains the image, the search results might include content for an item 204 that has that type of neckline but in a different style or shape that is of interest to the user. The search results may also include content for an item 206 that has the desired neckline, but may not have other attributes of interest to the user. A third result 208 that might be of interest to the user may or may not be returned if the item is not classified or tagged as having the specified type of neckline and might only appear if that item was determined to be relevant based on the other keywords or aspects of the query. There also can be content for another result 210 returned that is classified as having the specified type of neckline, but at least in the mind of the user does not include the type of neckline that is of interest to the user, or may have been improperly classified. Thus, it can be difficult using traditional keyword, query, and navigational approaches to refine search results (or other presentations of content) along such visual attributes.

Figure 3:
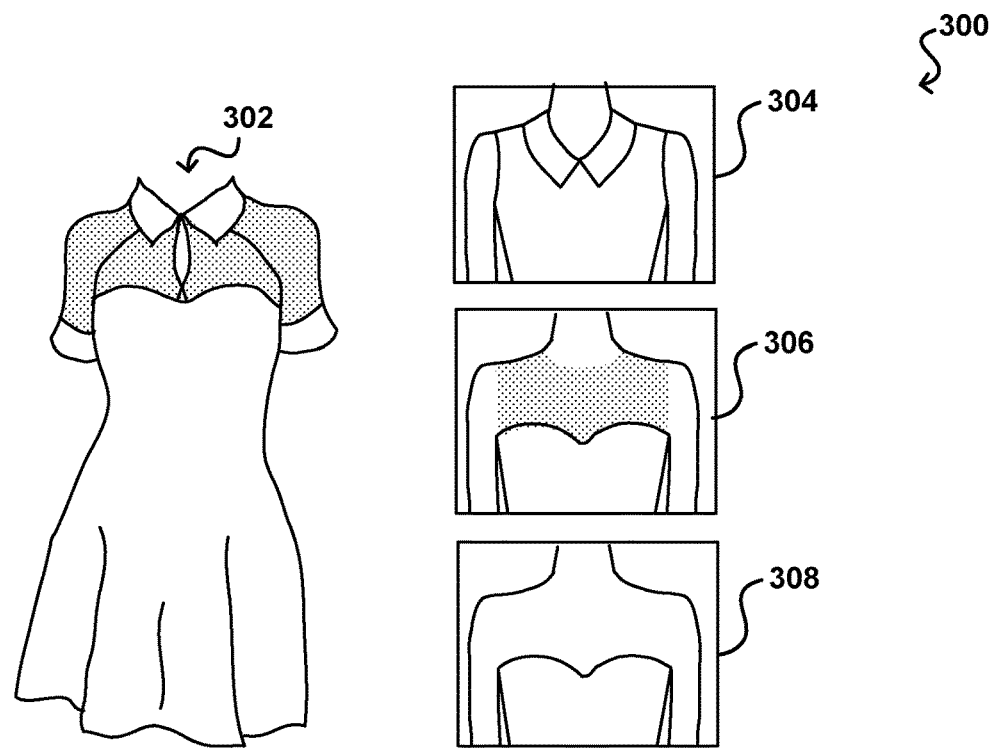
FIG. 3 illustrates an example situation where a classification-based search may not provide sufficient results using a process in accordance with various embodiments.

Further, there can be some items that are not easily classifiable with a single classification. In the example situation 300 of FIG. 3, an image of a dress 302 might be presented where the dress represented in the image has a neckline that exhibits aspects of various types of neckline. The neckline exhibits aspects of a peter pan neckline, as illustrated by the dress of a first image 304, an illusion neckline as illustrated by the dress of a second image 306, and a sweetheart neckline as illustrated by the dress of a third image 308. As illustrated, however, any of those classifications alone would result in images of a type of dress represented in one of the individual images 304, 306, 308, and adding all three of those terms in a search query might result in no search results being returned as no dress may be categorized with all three necklines.

It has been demonstrated that certain fashion details, such as neckline, collar, sleeve, shape, length, pocket etc., can have a significant influence on online shoppers' choices when those shoppers are searching for items with aesthetic or visual components, such as clothing items. The inherent limitation of text-based search makes it difficult to return an accurate result, especially when an item for which a customer is searching does not fit a strict or typical instance of a particular category or type of item. Further, conventional image-based recommendation systems are not particularly suitable for this task because those systems work in a holistic style.

Accordingly, approaches in accordance with various embodiments can attempt to relate items by various visual attributes in order to enable users to locate and/or results according to those attributes. Multiple visual attributes can be analyzed for an item, where the applicable attributes can vary by factors such as the type or category of item. In some embodiments, the items in a category can be logically arranged in an n-dimensional attribute space, or representation space, wherein the various attributes can be used to refine or locate new search results based on the attributes specified by a user. Such approaches can enable a system or service to recommend apparel products that are visually similar to queries, especially in regards to visual or fashion details. In some embodiments the visual attributes can be localized in the query images as well as in the catalog images. The visual similarities can be computed while applying specific attention to these regions. Such a system can improve an online shopping experience, for example, in that it provides results that are consistent with customers' visual perceptions. Approaches presented herein can work on catalog or other stored images, as well as mobile queries or social media images of apparel items, etc. Such approaches can also support multiple possible forms of outputs, which can simplify integration with other visual or non-visual attributes in a general-purpose apparel shopping engine or other such application.

Figure 4A:
FIGS. 4A and 4B illustrate approaches to providing related content based at least in part upon attribute visual similarity that can be utilized in accordance with various embodiments.

The ability to relate content by visual attribute enables content to be located, presented, or otherwise determined based at least in part upon the specification of one or more of those attributes. FIG. 4A illustrates an example display 400 that can be provided in accordance with various embodiments. In this example the user has navigated to, or otherwise been presented with, a detail page including content 402 for an item of interest, in this case a specific dress. In addition to the primary content 402 relating to that dress, the page can present supplemental content 404 for items relating in some way to the dress of the primary content. In this example, the items selected for presentation are dresses that have a similar visual attribute, in this example a similar neckline. The neckline attribute could be selected for a number of different reasons, such as user specification, provider selection, past user behavior, and the like. Here, the items selected are not selected based upon the categorization alone, as a category may be women's dresses or women's summer dresses, etc., but the selection is at least partially based on the visual similarity of the specified visual attribute. As discussed later herein, the user can have the option in some embodiments of specifying one or more attributes, changing to a different attribute, providing a relative ranking or weighting of attributes, etc.

Figure 4B:
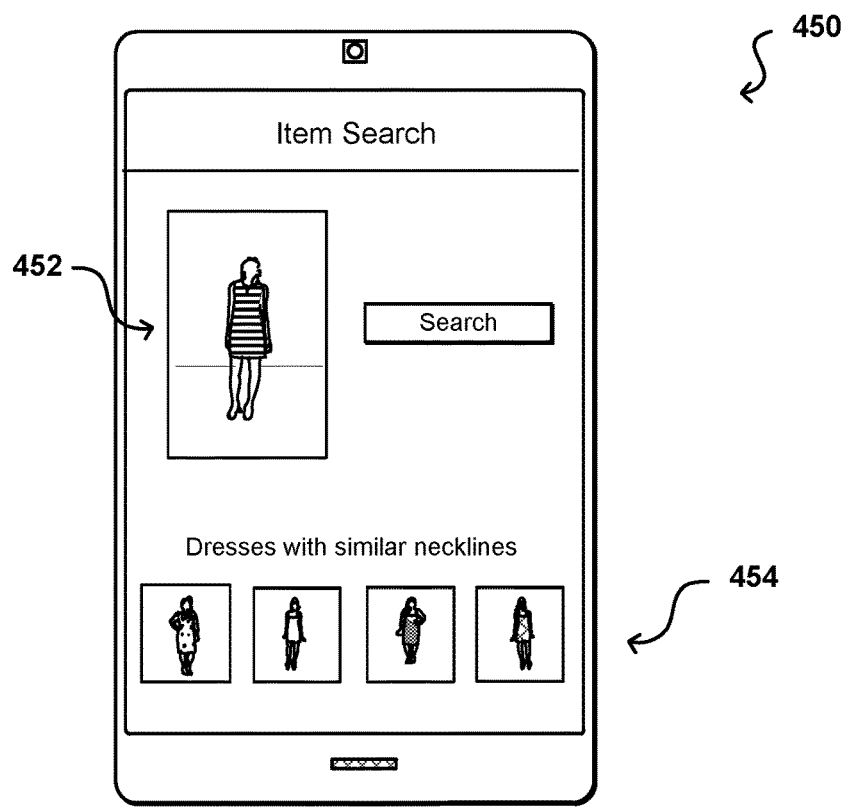

FIG. 4B illustrates a different example display 450 that can be provided through a search application or other such source. In this example an image 452 has been captured (or otherwise obtained) that includes a representation of an item of interest, here a dress. The user can cause this image to be used as a search query to locate similar items. In this example, a set of search results or recommendations 454 is displayed that exhibit similar necklines to the dress of the query image. As with the example of FIG. 4A, the neckline attribute could be specified or selected through any of a number of different approaches, which can be modifiable in at least some embodiments. Such an approach enables a user to locate items that have a similar visual attribute to an item located by the user. As mentioned, the image could be obtained from other sources as well, such as by copying the image from a webpage or social network feed, etc.

In order to determine visual similarity of various items through image comparison, approaches in accordance with various embodiments can be determined through the use of machine learning approaches, such as those that utilize convolutional neural networks. The relationships between items across various visual attributes can be learned through the analysis of various types of training data. For example, deep neural networks can be trained using a set of training images exhibiting different types or values for a given attribute, that can then be applied to content of one or more categories or types of items. In other embodiments, generative adversarial networks (GANs) can be used that do not require the seeding used for training deep neural networks. Various other approaches can be used as well as discussed and suggested elsewhere herein. Deep neural networks, or deep learning, can involve representing images or other content items as vectors or sets of edges or regions to simplify the learning task. These processes can allow for unsupervised learning and hierarchical feature extraction, among other such options. Deep learning algorithms can transform these inputs through multiple layers of transformation to describe causal connections between input and output. GANs can estimate a general model of such inputs using an adversarial process, as may utilize a generative model and a discriminative model. The discriminative model discriminates between different classes of data, such as a convolutional neural network trained to provide different outputs for different recognized classes. The generative model generates new data that fits the distribution of the training data. The generative model can be, for example, a Gaussian mixture model that can generate a set of points which approximately fit the training data. Various other networks or trained models can be used as well within the scope of the various embodiments. For approaches that require seeding, there can be a set of training data defined or otherwise generated for each attribute applied for a given category. The attributes can be defined by an administrator or other authorized entity, or can be learned algorithmically based on user queries, among other such options.

Figure 5:
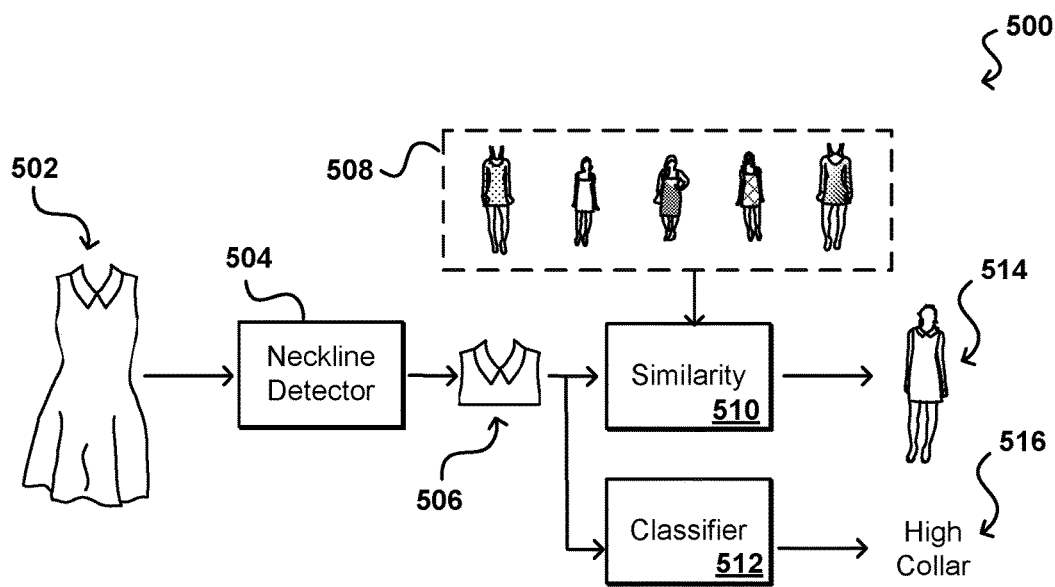
FIG. 5 illustrates an example attribute similarity pipeline that can be utilized in accordance with various embodiments.

FIG. 5 illustrates an example visual attribute pipeline 500 that can be utilized in accordance with various embodiments. In this example, an image of an item 502 is provided or otherwise obtained. In this example the image is to be used as training data for a convolutional neural network. The image can be classified, either when provided or through a classification analysis, to determine a primary classification, such as a woman's dress. If provided by a user, information such as the keywords in the query or other information provided by the user can be used to classify and/or select the image for training. Various other images provided by third party sources can be used for training as well as discussed and suggested elsewhere herein. Based at least in part upon the classification, a visual attribute can be selected to be used for training. In some embodiments the attribute for training will be selected ahead of time and images of appropriate categories provided. An image of an item thus might be used multiple times to train networks for different visual attributes. In at least some embodiments a localization process can be used to attempt to select a portion of the training image that includes the visual attribute of interest. For a sleeve length this can include locating the arms of a person represented in the image, and for belt style may include identifying a waist region of the person, among other such options. Here, a neckline detector 504 can be used to determine the region of the image that likely corresponds to the neckline portion, as discussed in more detail elsewhere herein. A number of state of the art detectors, including those discussed elsewhere herein, can be used to determine a region of an image corresponding to an attribute, or fashion detail in this example. Once that region has been identified, the image data 506 from the region can be cropped, copied, trimmed, or otherwise obtained as a discrete patch, file, or data set for processing.

In some embodiments the image data can be sent to a classifier 512 that is able to analyze the data and determine a type of neckline, or categorization 516 of neckline, that most closely matches what is represented in the image data. As mentioned, this can provide less accurate results for visual similarity matches, but a classification or text descriptor can help to provide matches when receiving conventional text queries or for other keyword-based interactions. In some embodiments the image data is processed before being sent to the classifier. This can include, for example, performing feature extraction on the cropped image data. In this example, the cropped image data is fed into a deep neural network, and from the fully connected layers output is received that can be used as a feature vector. The feature vector can then be fed to the classifier for classification.

The image data or feature vector can also, or alternatively, be sent to a similarity module 510, system, or service, which can use the image data for training. This can help to determine similarities to other items 508 of that category, with similarities being determined in some embodiments by relative distance in attribute space as discussed elsewhere herein. If the image data is passed as a query image, the similarity data can be used to determine items with similar visual attributes, and either content for a most similar item 514 or set of similar items can be presented. In some embodiments where the similarity can be determined by distance in attribute space, the search results can be ranked by distance, with the shortest distance to another item identifying the most similar item, which can be presented as the highest ranked search result.

As mentioned, the deep neural network can be trained on appropriate training data for the particular attribute, as there will be a trained neural network for each attribute of interest in at least some embodiments. In some embodiments the neural network can be trained using images from a catalog that include metadata, description, classification, or other data that can be used to identify an image having the desired attribute. Localization can then be performed to determine the relevant region, and that data fed to the neural network for training. While the process may not be completely accurate, a large enough data set should enable the network to be trained on the relevant features of the attribute without being negatively impacted by the occasional improper categorization or localization. In some embodiments high frequency attribute terms can be determined to be used as an initial set of base classes for a given attribute. A conventional training process can be used with the deep neural network, although various other approaches can be used that may provide particular advantages as well. In some embodiments the fully connected layers of the network can also be analyzed without need to analyze the classification result of the final layer. Intermediate features from the network can be used for similarity calculations in at least some embodiments. As discussed, the similarity score in at least some embodiments can be based on the distance between any two such features. Shorter distances can correspond to more similar attribute details.

Figures 6, 7:
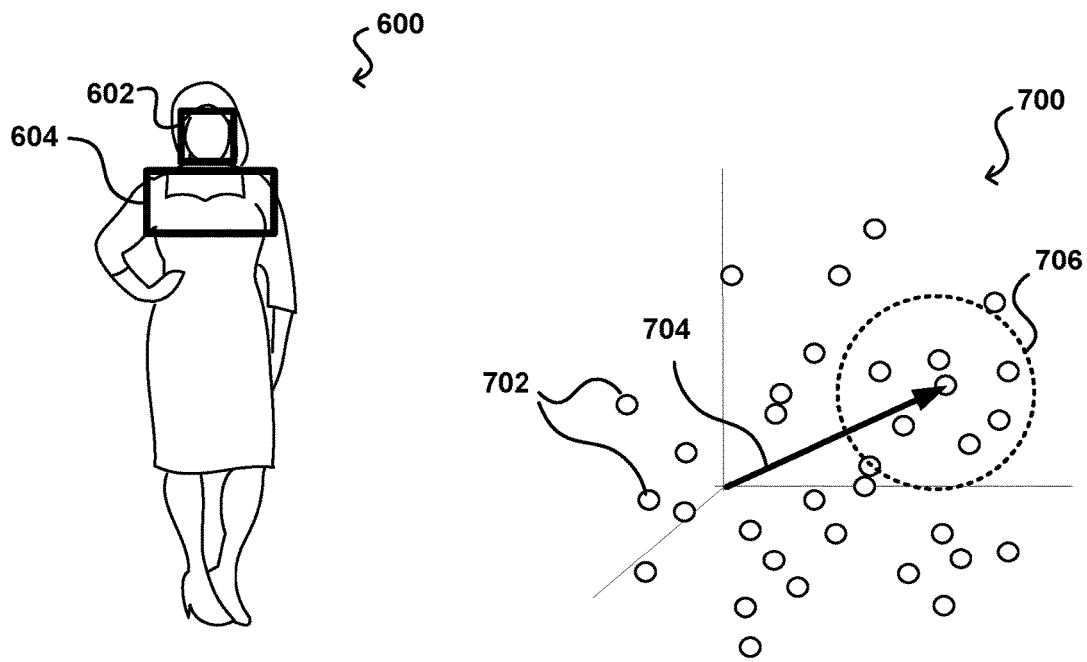
FIG. 6 illustrates an example approach to identifying an attribute region in an image that can be utilized in accordance with various embodiments.
FIG. 7 illustrates an example approach to selecting related items based at least in part upon attribute visual similarity that can be utilized in accordance with various embodiments.

FIG. 6 illustrates an example attribute localization approach 600 that can be utilized in accordance with various embodiments. In this example, a face detector algorithm can be used to determine a region 602 of an image that corresponds to a person's face. Various other detectors can be used as well, such as may depend upon the feature of the person and/or the type of attribute to be determined. For a neckline, the region with the neckline will generally be represented in an upper torso portion of the person, between the shoulders or arms, and below a head location, although orientations may change based upon pose or the person or other such aspects, which may be accounted for by at least some detectors. In this example, a face detection algorithm is used due to its relatively high accuracy and relatively now processing requirements. The face region 602 can be located, and based upon factors such as the scale, orientation, and confidence level of the region, a second region 604 can be determined that likely includes the neckline portion of the image data. In this example, the neckline region 604 is positioned at a slight distance from the face region, and is of at least the same height as the face region 602 and at least twice as wide, although various other factors and dimensions can be used as well within the scope of the various embodiments. There can be a general spatial relationship between a particular fashion detail and at least one body part or portion for many fashion attributes. Further, the size, dimension, and orientation data for the region can be learned or refined over time based upon the training data, etc. Once the neckline region 604 is identified, this region (also referred to as an image patch) can be used as the training data for the neural network. In some embodiments a local detail detector can be trained directly using the set of training images. Object detection algorithms useful for such an approach include a deformable part model (DPM) or fast regions with convolutional neural network features (Fast R-CNN) algorithms.

As mentioned, a point or vector can be defined in an n-dimensional attribute space for each input image that is classified. For example, there may be various attributes, types, or variations for a neckline category that can each be represented by an axis in the attribute space. In the example plot 700 illustrated in FIG. 7, each axis can potentially correspond to a type of neckline, or aspects of various necklines. For example, one axis could represent jewel necklines and one could represent sweetheart necklines, while another axis could represent an axis value such as roundness, and so on. Each axis could run from a value of 0, which can represent that the neckline in no way resembles that type of neckline, to a value of 1, for example, which indicates that with complete certainty the neckline in an image corresponds to this type of neckline. For many dresses the neckline may correspond strongly to one type, but may exhibit at least some features of other types, such that a neckline vector for an image in attribute space may have values along multiple axes. For many dresses there will be at least some non-zero value for each axis, as necklines in general exhibit some similarities so there may be at least a low value for most axes for an image. In some embodiments the value will be a confidence or match score, among other such options. A given item can then have a corresponding vector 704 in the neckline space. Other items will also have vectors or representations 702 in that space as well. When a user wants to locate items with similar necklines, the points closest to the end of that vector 704 in attribute space can be determined, and content for those items returned as similar results. These could be, for example, a minimum number of the closest points 702, or points within a specified distance or proximity region 706 around the end of the vector, among other such options. In this way, the items with the most similar necklines can be determined independent of the classification of the necklines for those individual items. A vector-based approach can be expanded to any number of attributes, where the n-dimensional attribute space corresponds to the n defined attributes for that category. It should be understood that in some embodiments the attributes may not have names or definitions that make sense to human users, but might be attributes learned through machine learning that can visually distinguish between types of items, and which can be used by analogy to find items that relate to a specified item in a way that other identified items relate to each other. In some embodiments a user can specify two images that show the type of refinement desired, and the refinement vector can be calculated based upon attribute differences determined for those images. The distance between the two items as represented in attribute space provides a measure of the similarity for a given attribute. The score calculation can involve taking a dot product between two feature vectors, for example, or learning a probabilistic classifier that calculates an input image's scores or probability of demonstrating various candidate classes or attributes. The dot product or distance in this classification score vector domain can then be analyzed, or in some embodiments only the dimension corresponding to the most probably class is utilized. The last layer of a CNN can provide such a classifier that can be used directly for score calculation.

Figure 8A:
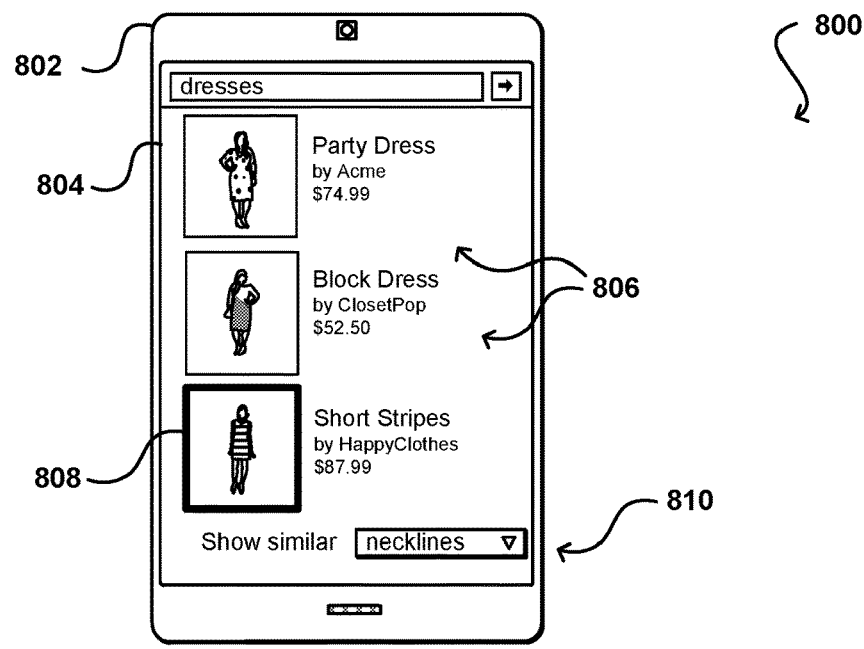
FIGS. 8A and 8B illustrate example interfaces that can enable a user to specify one or more attributes for use in refining search results that can be utilized in accordance with various embodiments.

In some embodiments a user can specify at least one type of attribute to be used for the similarity determination. For example, FIG. 8A illustrates an interface 800 wherein multiple images 806 of items are displayed on a display 804 of a computing device 802. A user is able to select at least one of the images 808 to use as a query image to find more items in the same (or a similar) category with at least one similar attribute, which in this example can be specified by a user using a user-selectable element 810. In this example, the user has selected the attribute "necklines," which can cause the selection of item images to be updated to find items with similar necklines. If a user then selects a different (or the same) image and changes the attribute element 810, such as to a value such as length, then the images can be updated to show a selection of items having a similar length. Each change can start a new search, or can be treated as a refinement where each change builds on the previous change. For example, a user can select a first dress with a desired neckline to receive images of items with similar necklines, then can select one of those images and select to see items with a similar length, which will then still have similar necklines but also have similar lengths. This enables a user to search using visual attributes to arrive at the item(s) of interest without needing to know or formulate a specific keyword query, or set of queries, to attempt to locate those items.

Figure 8B:
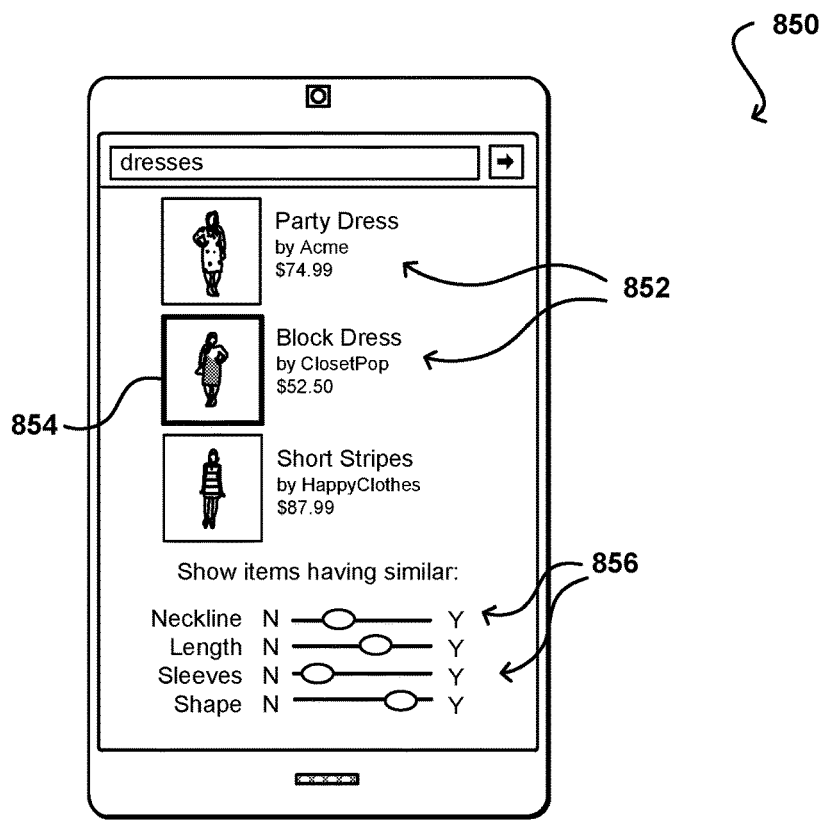

FIG. 8B illustrates another example interface 850 that can be utilized in accordance with various embodiments. In this example, a user can again select at least one image 654 of a set of displayed images 852 to be used as a reference for a query or query refinement. In this interface, however, the user is presented with a set of options 856 showing at least some of the relevant attributes for that category of item. This can either be a fixed set of attributes, a set based upon user preference or history information, or other such factors. In some embodiments a user can have binary options, such as to select whether or not they would like the new set of results to have similar values for those attributes, such as where a user wants to see dresses with a similar neckline but not similar sleeves, or does not care about the similarity of the sleeves. In this example the user can provide a relative weighting for the various attributes, so the user can provide a ranking or level of interest in each attribute. For example, if the user really likes the neckline of a dress in a selected image 854 then the user can weight that relatively highly, but if the user doesn't like the sleeves or care about finding similar sleeves then the user can weight that attribute relatively lowly. In some embodiments, the values or weightings provided for each attribute can serve as a magnitude for the corresponding vector or distance in attribute space that is used to locate the search results. For example, given the illustrated attribute values a result region around the item of the selected image 854 might be defined by a relatively tight value range along a shape attribute axis, due to the desire for very similar shapes, while the region might be defined by a much larger value range along the sleeve attribute axis, as the sleeve shape does not need to be similar to the sleeves in the selected image 854.

In one embodiment the results can be updated dynamically in response to each movement or adjustment of a slider bar or other user-adjustable element. The user can adjust each slider bar until the desired type of results is displayed. Such an approach can adjust the magnitude of each vector in attribute space in at least some embodiments, although different levels of attribute adjustment might result in different vectors in other embodiments. In some embodiments the user can select two or more of the search results as a base and then adjust the slider bars to have the refinements based attributes of the selected images, in order to view results that are like the selected results but with the desired refinements.

In some embodiments the base item may not be from a search result page, but might be primary content displayed on a page. For example, a user may have navigated to a page for a dress that is of interest to the user. The page may include attribute refinement options as discussed herein that can enable the user to obtain results that are similar to the currently displayed item content, but differ based on the selected attribute refinement. The results can be displayed on the same page, or can be opened in a new page or window, among other such options. In some embodiments the user can specify an image as a reference point that may or may not be available through the site or from the source, and can then apply the attribute vectors to attempt to determine the closest items offered from that source. And as mentioned, the attributes might vary by category or type of item or content. For example, dresses might include attributes such as formal, long, and colorful, while batteries might include attributes such as lifetime and rechargeable. For content such as news, the attributes might include things like political, opinion, international, and the like.

For an input image, various embodiments can perform some amount of pre-processing. This can include, for example, removing a background portion from consideration, potentially reducing a color depth or resolution, performing noise reduction, removing portions not associated with the item of interest (such as legs protruding from the bottom of a dress), and the like. The image can then be passed through a neural network with the desired attributes in order to determine the relevant location in attribute or representation space, and then present the nearest results as search results for the input image. In at least some embodiments the process can involve mapping the input image into the appropriate location in vector space based at least in part upon the determined attributes. Each image can then correspond to a point or an n-dimensional vector in vector space. In at least some embodiments the same or different models can be trained to recognize or identify the type of item as well. For example, a user might provide or specify a search image including a representation of an item that has not yet been classified. The image can be processed with a model or network capable of determining the type of item. The model or network can also be used to verify the type of item, such as where the image is tagged with a dress tag but actually shows an entire outfit, etc. In some embodiments text, description, or metadata associated with an image can also be used to attempt to identify the item or at least narrow the search space. This information can include, for example, text, bullet points, descriptive text analyzed to extract unigrams, bi-grams, and tri-grams that are then analyzed for number of occurrences. In some embodiments repeated n-grams on the same page are not counted and similar n-grams merged. Further, associated text or data can help to distinguish between types of items that might look the same, such as an automobile or a toy model of that automobile. For some embodiments, the image may be able to be broken up to find matches for only a portion of an image, such as for a skirt or top portion of a dress. In some embodiments a user can specify portions of different images, such as the sleeves of one dress and the neckline of another in order to locate similar items in vector space.

As mentioned, in some embodiments items can be determined based upon learned attributes that may not be clearly defined for a user. Such attributes may be used by a user to locate other items that may potentially be of interest. For example, if a user sees a search result for a query that the user likes, the user might select an option to see more items like the selected item. Or the user may select an option to see options that are not like a selected item or image. The learned attributes can be used to determine new search vectors to find items that have similar attribute with respect to an input or item, even though the user or system may have trouble articulating what those attributes are.

Actions taken by a user can also be used to train or refine the models as well. For example, if a user submits a refinement and obtains a result that leads to a purchase of the corresponding item, then that refinement can be used as a correct refinement vector for that attribute that can be used as an additional input to train the corresponding model. As attribute perception can change over time, data can also be weighted or decayed such that more recent data counts more heavily towards the refinement, and data past a certain age may be discarded from consideration.

Figure 9:
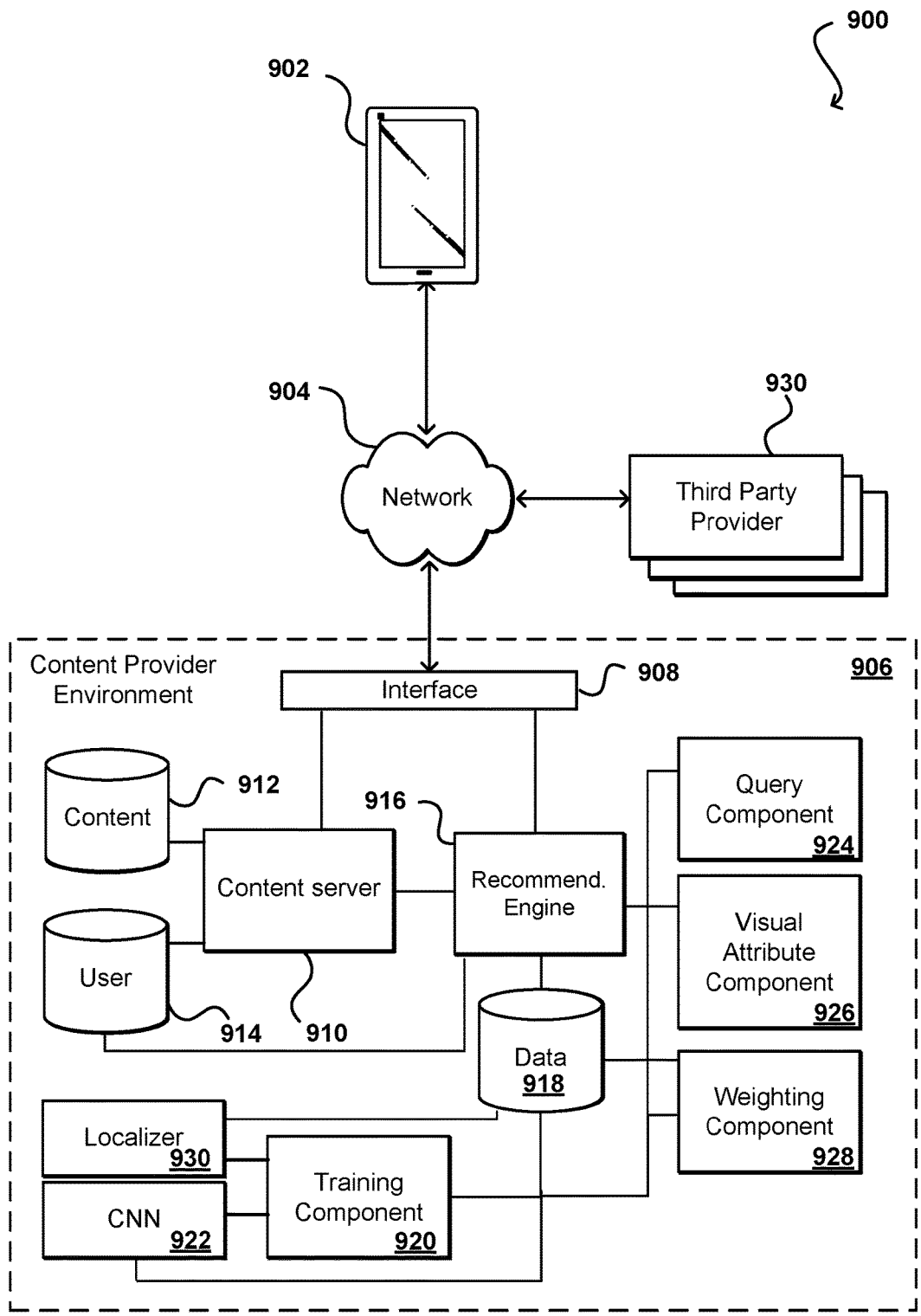
FIG. 9 illustrates an example system for performing attribute-inclusive searches that can be utilized in accordance with various embodiments.

FIG. 9 illustrates an example environment 900 in which aspects of the various embodiments can be implemented. In this example, a computing device 902 is able to make a call or request across one or more networks 904 to a content provider environment 906. The network(s) can include any appropriate network, such as the Internet, a local area network (LAN), a cellular network, an Ethernet, or other such wired and/or wireless network. The content provider environment 906 can include any appropriate resources for providing content from a resource provider, as may include various servers, data stores, and other such components known or used for providing content from across a network (or from the "cloud").

In this example, a request received to the content provider environment 906 can be received by an interface layer 908 of the environment. As known for network environments, the interface layer can include components such as interfaces (e.g., APIs), load balancers, request and/or data routers, and the like. If the request is a request for content, such as for content for a page to be displayed in an application, information for the request can be directed to one or more content managers 910 and/or content servers, which can obtain the content from a content data store 914 or other such repository to be sent back across the network(s) to the computing device. In some embodiments, information for the request might also be compared against user data in a user data store 912 or other such location do determine, for example, whether the user has access rights to that content. In some embodiments user data might also be analyzed to determine which type of content to provide, additional supplemental content to provide with the primary content, and the like.

In some instances a user might want to refine the results based upon one or more visual attributes. In at least some embodiments each category or type of item may have corresponding types of visual attributes that can be used to refine the results. In some embodiments an indication of these attributes can be returned with the initial results, as may be determined by the content server 910 or the recommendation engine based upon data stored in the data repository 918 or determined using a query component 924 or visual attribute component 926, among other such options. When a subsequent request is received that requests a refinement using one or more of those visual attributes, the recommendation engine can work with the query component 924 and visual attribute component 926 to determine, among other things, the values for the refinement based on the query or prior results and the vectors for the individual attributes. As mentioned, in some embodiments the request might specify rankings or magnitudes for the various attributes, which can be set in some embodiments using a weighting component 928 or other such mechanism. The information can be fed back to the recommendation engine 916 which in this example includes the refinement logic to perform the lookup against the data in the data store 918 in order to determine the refined results.

The individual attribute vectors can be determined at least in part using neural networks 922 such as a CNN to determine the appropriate vectors through training on an appropriate data set. The training component 920 can perform the training on the models and provide the resulting results and/or trained models for use in determining the individual attribute vectors. In order to determine attributes for various content items, in at least some embodiments, some analysis of content items in an electronic catalog or other data repository is performed to determine information about the visual characteristics of the items. In some embodiments, one or more feature descriptors or vectors can be generated to describe various attributes of an image (such as brightness, formalness, etc.). The training component 920 can be the same system or service that is used to train the localizer 930, as well as various face detectors or other models, networks, or algorithms discussed or suggested herein.

In the example shown in FIG. 9, a neural network 922 such as a convolutional neural network (CNN) can be trained using, for example, images of objects. As mentioned, for CNN-based approaches there can be pairs of images submitted that are classified by a type of attribute, while for GAN-based approaches a series of images may be submitted for training that may include metadata or other information useful in classifying one or more aspects of each image. For example, a CNN may be trained to perform object recognition using images of different types of objects, then learn how the attributes relate to those objects using the provided training data. In certain embodiments, training a neural network may involve significant use of computation resources and time, such that this may correspond to a preparatory step to servicing search requests and/or performed relatively infrequently with respect to search request servicing and/or according to a schedule. An example process for training a neural network for generating descriptors describing visual features of an image in a collection of images begins with building a set of training images. In accordance with various embodiments, each image (or pair of images) in the set of training images can be associated with an object label describing an object depicted in the image or a subject represented in the image. According to some embodiments, training images and respective training object labels can be located in a data store 918 that includes images of a number of different objects.

A training component 920 can utilize the training data set to train the neural network 922. As further described, neural networks can include several learning layers in their architecture. A query image from the training data set is analyzed using the neural network to extract a feature vector from the network before the classification layer. This feature vector describes the subject and/or objects shown in the image. This process can be implemented for each of the images in the data set, and the resulting object feature vectors can be stored in a data store. In various embodiments, the resulting object feature vectors can be compressed for improved processing. For example, the object feature vectors generated by the neural network may include object feature vectors that have a large number of dimensions. The dimensions of these object feature vectors can be reduced by applying at least one of Principal Component Analysis (PCA) or Multi-Dimensional Scaling (MDS). Advantageously, such an approach can reduce storage demands and significantly improve latency performance. Additionally, such an approach can remove or at least reduce noise in the transformed space since the tailing dimensions generally correspond to noise and discarding them helps to focus on the useful signal when measuring similarities.

The initial query image in some embodiments may be received from client device 902 over network 904 and processed by query component 924. In some embodiments, the query image can be received when a selection of an image from a third party provider 932 or content provider environment 906 is selected, such as through the selection of a content item. When a query image is received, for example, a set of query object descriptors may be obtained or determined for the query image. For example, if the query image is not part of an electronic catalog and does not already have associated feature descriptors, the system may generate feature descriptors (both local feature descriptors and object feature descriptors) for the query content in a same and/or similar manner that the feature descriptors are generated for the collection of images, as described. Also, for example, if the query image is part of the collection then the feature descriptors for the query image may be obtained from the appropriate data store. Additionally, the query image can be analyzed to determine local feature descriptors for the query image. Using the clustered feature vectors and corresponding visual words determined for the training images, a histogram for the query image can be determined. The query image can also be analyzed using the neural network 922 to extract a feature vector from the network before the classification layer. This feature vector describes the subject and/or objects shown in the image. Using the local feature descriptors and object feature descriptors, visually similar images in content provider environment 906 can be identified.

Figure 10:
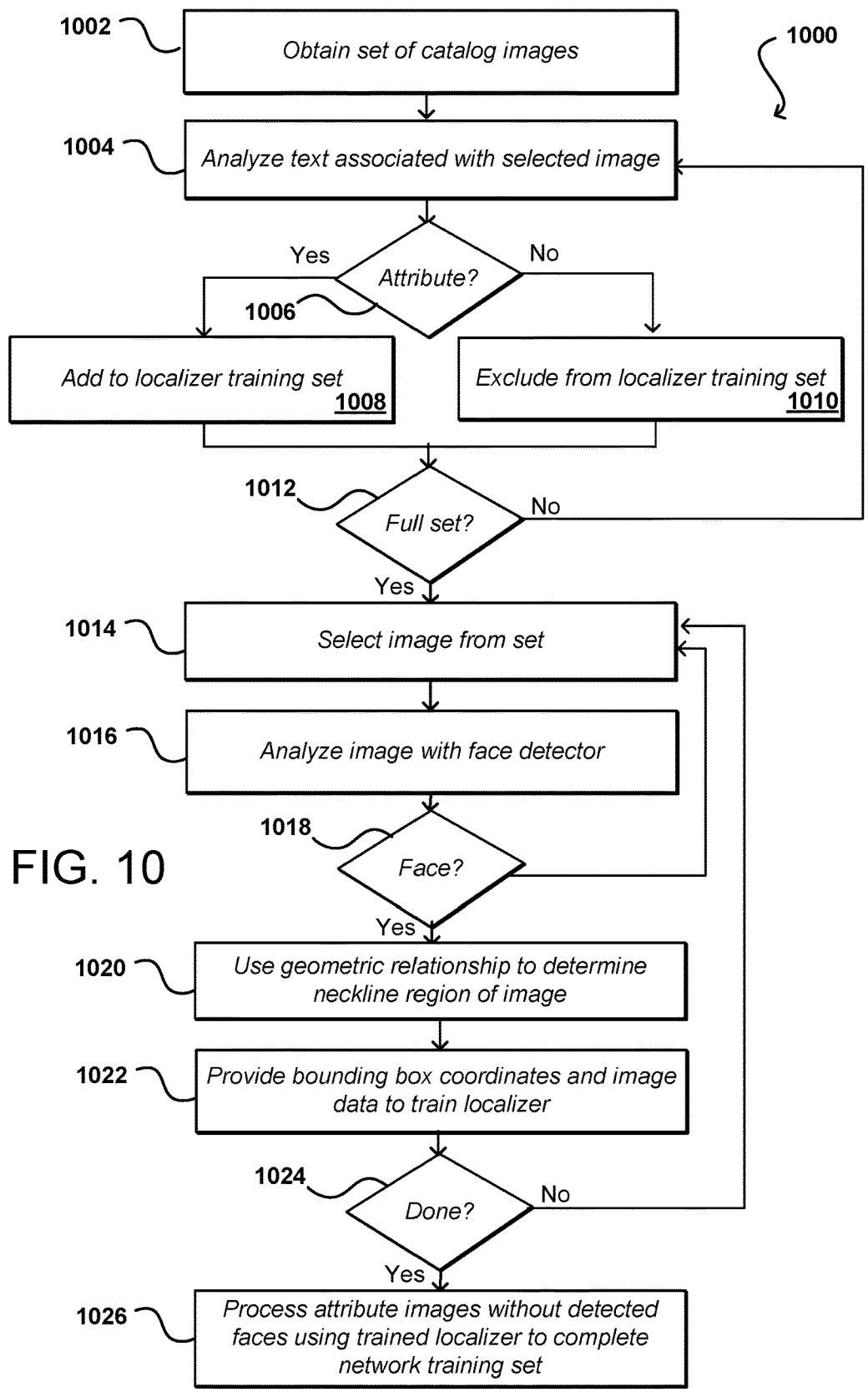
FIG. 10 illustrates an example process for training a localizer for a specific visual attributes that can be utilized in accordance with various embodiments.

FIG. 10 illustrates an example process 1000 for training an attribute localizer that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, a set of catalog images obtained 1002 for analysis. This can be from a catalog maintained by a service provider or a third party, or from multiple sources, among other such options. Further, the images may not be related to a catalog but may come from one or more other types of image collections in accordance with various embodiments. For at least some of the images, such as a randomly selected subset or another such determination, text or other content associated with the images can be analyzed 1004 to determine whether one or more items represented in those images correspond to a determined attribute, or type of attribute, for which a neural network is to be trained. This can include, for example, a specific type or value of a visual attribute, such as a type of neckline, length, or shape as discussed elsewhere herein. The content can be any content associated with an image, such as metadata for that image, text from a page associated with that image, database text mapped to that image, and the like. If it is determined 1006 that an image likely includes a representation of an item exhibiting the attribute then that image can be added 1008 to the training set. If not, the image can be excluded 1010 from the training set. As mentioned elsewhere herein, in at least some embodiments some of the items may be instead added to a testing image set or not added to any set but may have the attribute classification associated therewith. If it is determined 1012 that a full training set has been obtained, using any appropriate criterion as discussed or suggested herein, then the training set generation can complete. Otherwise, the process can continue until a full set is obtained, all of the relevant catalog images are analyzed, or another stop condition is satisfied.

Once a training set is obtained, or after at least a subset of the set is obtained, at least one image can be selected 1014 from the set for analysis. For a selected image, localization can be performed to obtain an image patch corresponding to the attribute. As mentioned, this can involve using a trained object detection algorithm or using a spatial relation approach wherein a body part or other feature is identified in the image that can then be used to determine the patch region where the attribute is likely represented. Other localization processes can be utilized as well as discussed elsewhere herein. In this example, at least some of the images of the training set are analyzed 106 with a face detector, which can provide an appropriate starting point for localization of an attribute such as a neckline. As mentioned, other objects or body parts may be appropriate for other types of visual attributes, etc. A determination can be made 1018 as to whether a face is detected in a particular image. If not, that image can be held for subsequent analysis and another training image selected for face detection.

For training images where a face was detected, at least with a certain level of confidence or certainty, etc., one or more geometric relationships can be used 1020 to determine the neckline region of the image. As discussed elsewhere herein, aspects such as the size, location, and orientation of the detected face region can be used to determine a region in which the neckline is likely to appear, which can be in a region that has a size, location, and orientation based at least in part upon the aspects of the detected face region. In this example the region will be a rectangular region located proximate a "bottom" or chin portion of the face region. In some embodiments the image data can be cropped or trimmed to include only the neckline region, or a new image patch generated that includes that data. In this example a bounding box around that region determined and the coordinates of the bounding box provided 1022 for use in training the localizer. This process can continue until it is determined 1024 that the training images with detected faces have been processed. The localizer can be trained using the image data for those images using the bounding box coordinates, so that the localizer trains on the data present in the localized attribute (or neckline) regions. The localizer can also be used to process 1026 attribute images that did not have detected faces, or had multiple possible faces or other such issues discussed herein, in order to complete the network training set.

Figure 11:
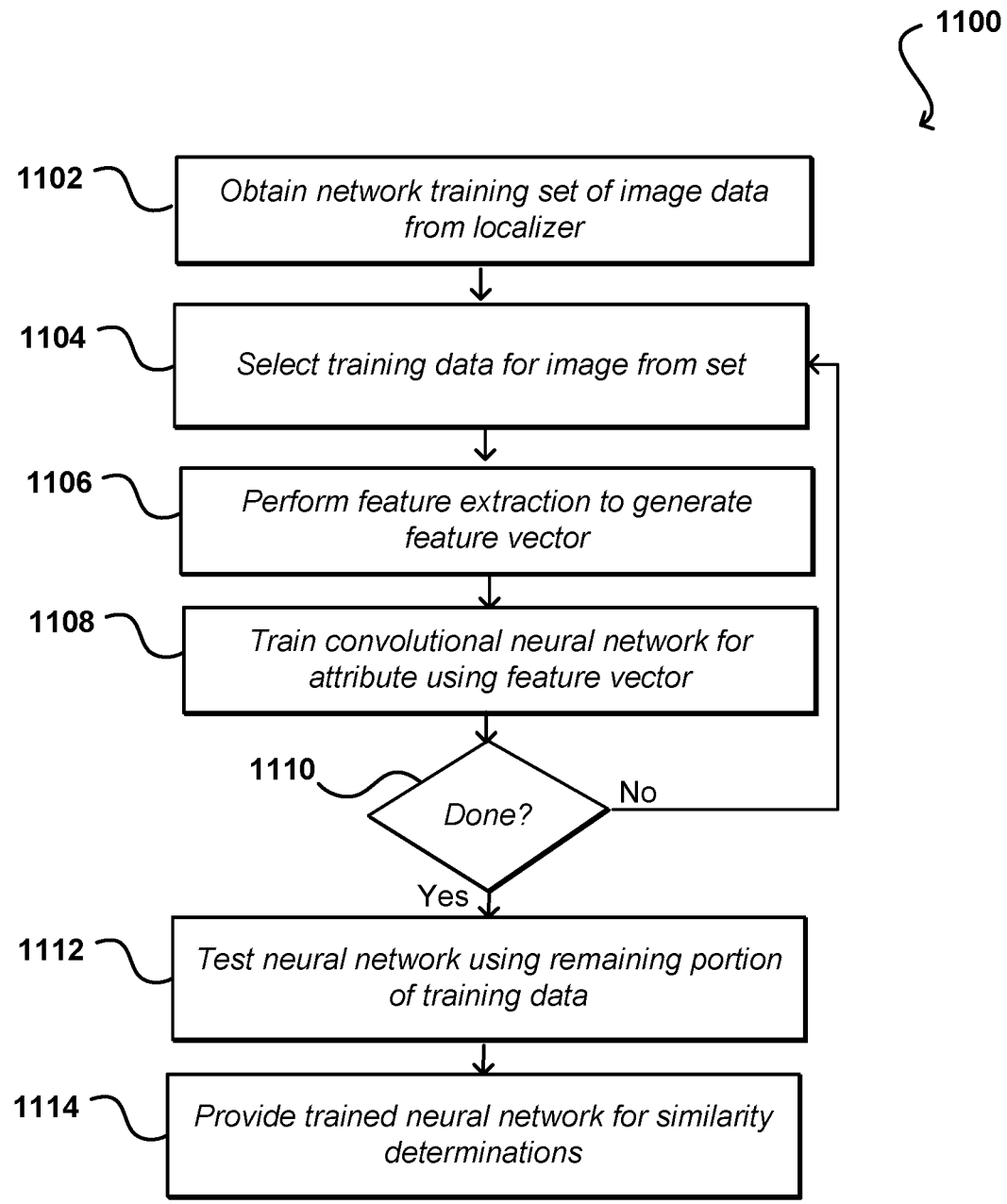
FIG. 11 illustrates an example process for training neural network on visual attributes that can be utilized in accordance with various embodiments.

FIG. 11 illustrates an example process 1100 for training an attribute-specific neural network that can be utilized in accordance with various embodiments. Once a set of training data is obtained, such as by using a localization process described with respect to FIG. 1, feature extraction (or another such process) can be performed to provide input to the network training process. In this example, training data for an image will be selected 1104 from the training data set. Feature extraction can be performed 1106 on the image data to generate a feature vector representative of the attribute in the image. The feature vector can then be fed to a training procedure in order to train 1108 the convolutional neural network for the determined type of attribute. If it is determined 1110 that a stop condition has been met so that training should be completed, such as by processing the entire training set or reaching a determined confidence threshold, then the trained neural network can be provided for similarity determinations. As discussed herein, the network might first go through a process to test 1112 using at least some of the image data classified with the attribute type from earlier steps of the process. If the training is not complete then the training process can continue until a trained model is obtained.

Figure 12:
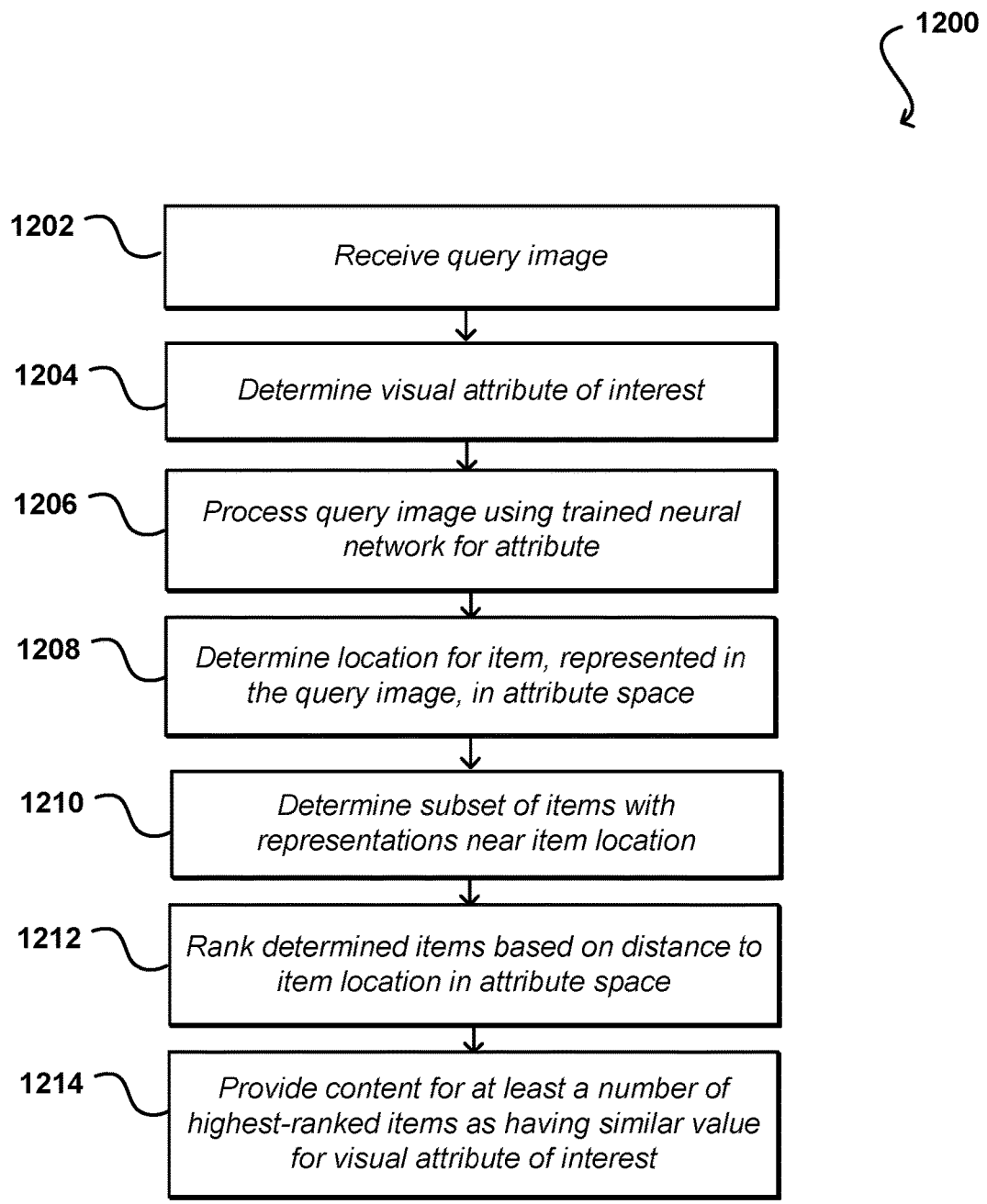
FIG. 12 illustrates an example process for determining content based upon visual attribute similarity that can be utilized in accordance with various embodiments.

FIG. 12 illustrates an example process 1200 for obtaining similarity-based results for a query image that can be utilized in accordance with various embodiments. In this example, a query image is received 1202. As mentioned, the query image can be received from any of a number of sources in a number of different ways. For example, the query image could be an image selected by a user or provided by the user, such as by the user capturing or uploading an image showing an item of interest. In other embodiments the query image can be associated with a navigation instruction, interface, data record, or other such source that is to be used to provide content, among others such options. As part of a content location or determination process, the visual attribute of interest can also be determined 1204. This can include, for example, receiving a request from a user or determining a specified attribute selection, among other such options. The determinations thus can be done automatically, manually, and/or as part of a pre-programmed approach, among other such options. In some embodiments the attributes can be based upon factors such as the type of item, user preferences, historical user behavior, and the like. In some embodiments the user can focus a captured image on an attribute of interest, such as a neckline region of an object, either in a single image or as part of a video or image series including image data for the attribute of interest as a focus on the image data. In some embodiments a user interface can provide instructions or guidance as to how to specify attributes of interest to the user through image capture or other such input. As mentioned there can be more than one attribute specified in some embodiments, with weightings or rankings possible in some embodiments as well. The attribute can be any appropriate visual attribute, such as a type of neckline or shape for a fashion item, among other such options. Based at least in part upon the attribute of interest, a neural network can be identified that has been trained for that type of attribute, and the query image can be processed 1206 using the trained neural network. The output of the neural network can be a similarity score to one or more other items, or values for the attribute for the image, among other such options. The location of the item in query space can be determined 1208, and a subset of items with representations near that location identified 1210. The distances between the query item location and the locations of the various items can be determined, or their similarity scores otherwise obtained from the network, and the items can be ranked 1212 based at least in part upon the relative distance or similarity score. Smaller distances in attribute space can correspond to higher similarity values. Once ranked or otherwise determined, at least a number (i.e., one or more) of the highest-ranked items can have content provided 1214 as having a similar value for the attribute of interest as the item represented in the query image.

Figure 13:
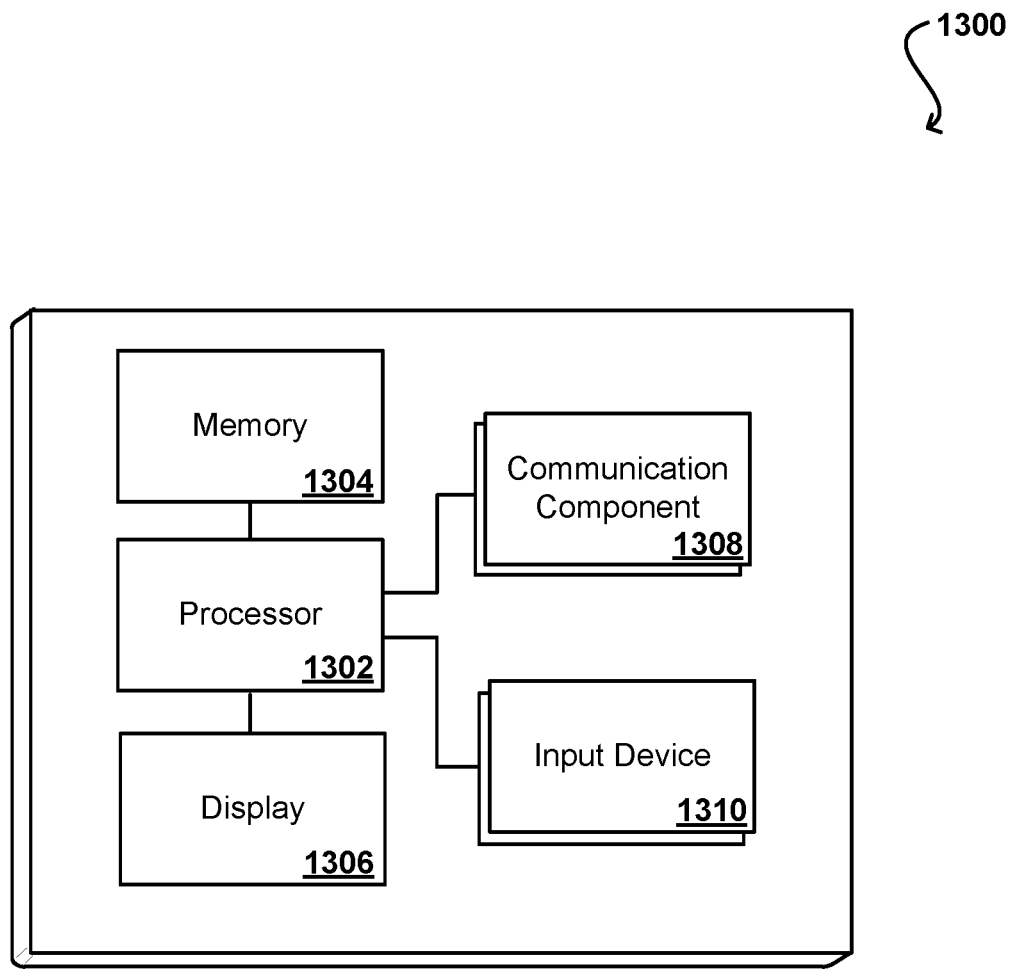
FIG. 13 illustrates example components of a computing device that can be utilized in accordance with various embodiments.

FIG. 13 illustrates a logical arrangement of a set of general components of an example computing device 1300 that can be used to implement aspects of the various embodiments. In this example, the device includes a processor 1302 for executing instructions that can be stored in a memory device or element 1304. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 1306, such as a touch screen or liquid crystal display (LCD), although devices such as portable media players might convey information via other means, such as through audio speakers. As discussed, the device in many embodiments will include at least one input element 1308 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 1300 of FIG. 13 can include one or more network interface elements 1308 for communicating over various networks, such as a Wi-Fi, Bluetooth, RF, wired, or wireless communication systems. The device in many embodiments can communicate with a network, such as the Internet, and may be able to communicate with other such devices.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker).

Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
obtaining a set of images each including a representation of a respective item;
analyzing text associated with the images to identify a subset of the images associated with a determined visual attribute;
performing localization on a selected image, of the subset of images, to determine a region of image data for the selected image associated with the visual attribute;
analyzing the region of image data associated with the visual attribute to extract a set of image features;
training a convolutional neural network using the set of image features from the selected image, the convolutional neural network being further trained using additional image features extracted from other images of the subset of images;

receiving a query image including a representation of a query item;

processing the query image using the convolutional neural network, trained for the visual attribute, to determine similarity scores between the query image and a set of result images; and providing content for at least a determined number of the result images having highest similarity scores based on the visual attribute.

2. The computer-implemented method of claim 1, further comprising:

determining a feature vector for the visual attribute of the query item as represented in the query image; and determining the similarity scores for the result images based at least in part upon a distance between an endpoint of the feature vector and respective endpoints for the result images in a multi-dimensional attribute space.

3. The computer-implemented method of claim 1, further comprising:

analyzing the query image to determine a type of the query item; and determining the visual attribute based at least in part upon the type of the query item.

4. The computer-implemented method of claim 1, further comprising:

analyzing the subset of the images, associated with the determined visual attribute, using an object detection process to identify object images including a representation of an object associated with the visual attribute;

determining, in each object image, a region associated with the visual attribute based at least in part upon one or more geometric relationships to the representation of the object in the object image; and providing coordinates for the region, associated with the visual attribute region, and the selected image for training a localizer used to perform the localization.

5. The computer-implemented method of claim 1, wherein object detection process is a facial recognition process configured to identify a representation of at least one face in an image of the subset of images.

6. A computer-implemented method, comprising:

determining a query image including a representation of an item;

determining a visual attribute of the item to be used to identify related items;

processing the query image using a convolutional neural network to determine similarity scores for each of a set of related items, each similarity score indicating a similarity between a variation of the visual attribute for a respective related item and the visual attribute of the item, the convolutional neural network trained using image features extracted from localized regions including representations of variations of the visual attribute; and providing content for at least one related item based at least in part upon the respective similarity score.

7. The computer-implemented method of claim 6, further comprising:

obtaining a set of images each including a representation of a respective item;

analyzing text associated with the images to identify a subset of the images associated with the visual attribute; and providing the subset of images as a set of training images for the visual attribute.

8. The computer-implemented method of claim 7, further comprising:

analyzing the set of training images using an object detection process to identify object images including a representation of an object associated with the visual attribute;

determining, in each object image, a region associated with the visual attribute based at least in part upon one or more geometric relationships to the representation of the object in the object image; and providing coordinates for the region, associated with the visual attribute region, and the selected image for training a localizer used to determine the localized regions.

9. The computer-implemented method of claim 8, further comprising:

processing the set of training images using the localizer to determine the localized regions associated with the visual attribute;

analyzing the localized regions to extract the image features from the training images; and training the convolutional neural network using the image features.

10. The computer-implemented method of claim 6, further comprising:

receiving the query image from a social networking source or an electronic device used to capture the query image.

11. The computer-implemented method of claim 6, further comprising:

determining the visual attribute based at least in part upon at least one of receiving a user specification or determining at least one visual attributes associated with a type of the item represented in the query image.

12. The computer-implemented method of claim 6, further comprising:

determining a feature vector for the visual attribute of the item as represented in the query image; and determining the similarity scores for the related items based at least in part upon a distance between an endpoint of the feature vector and respective endpoints for the related items in a multi-dimensional attribute space.

13. The computer-implemented method of claim 6, wherein the set of images includes representations of apparel items offered for consumption through an electronic marketplace, and wherein the visual attributes relate to fashion attributes of the apparel items.

14. The computer-implemented method of claim 13, wherein the fashion attributes include at least one of a neckline, a collar style, a sleeve style, an item shape, an item length, a pocket style, or a belt style.

15. The computer-implemented method of claim 6, further comprising:

receiving indication of a set of visual attributes, including the visual attribute, to be used to identify the related items; and determining the similarity scores for each of the set of related items based at least in part upon the respective values for the set of visual attributes.

16. A system, comprising:

at least one processor; and memory storing instructions that, when executed by the at least one processor, cause the system to:

determine a query image including a representation of an item;

determine a visual attribute of the item to be used to identify related items;

process the query image using a convolutional neural network, trained using variations of the visual attribute, to determine similarity scores for each of a set of related items, each similarity score indicating a similarity between a variation of the visual attribute for a respective related item and the visual attribute of the item, the convolutional neural network trained using image features extracted from localized regions including representations of variations of the visual attribute; and provide content for at least one related item based at least in part upon the respective similarity score.

17. The system of claim 16, wherein the instructions when executed further cause the system to:

obtain a set of images each including a representation of a respective item;

analyze text associated with the images to identify a subset of the images associated with the visual attribute; and provide the subset of images as a set of training images for the visual attribute.

18. The system of claim 17, wherein the instructions when executed further cause the system to:

analyze the set of training images using an object detection process to identify object images including a representation of an object associated with the visual attribute;

determine, in each object image, a region associated with the visual attribute based at least in part upon one or more geometric relationships to the representation of the object in the object image; and provide coordinates for the region, associated with the visual attribute region, and the selected image for training a localizer used to determine the localized regions.

19. The system of claim 17, wherein the instructions when executed further cause the system to:

process the set of training images using the localizer to determine the localized regions associated with the visual attribute;

analyze the localized regions to extract the image features from the training images; and train the convolutional neural network using the image features.

20. The system of claim 16, wherein the instructions when executed further cause the system to:

determine a feature vector for the visual attribute of the item as represented in the query image; and determine the similarity scores for the related items based at least in part upon a distance between an endpoint of the feature vector and respective endpoints for the related items in a multi-dimensional attribute space.

* * * * *